(12) United States Patent
Brotz

(10) Patent No.: US 6,318,666 B1
(45) Date of Patent: Nov. 20, 2001

(54) SUPERCONDUCTIVE GEOMAGNETIC CRAFT

(76) Inventor: Gregory R. Brotz, P.O. Box 1322, Sheboygan, WI (US) 53081

( * ) Notice: Subject to any disclaimer, the term of this patent is extended or adjusted under 35 U.S.C. 154(b) by 0 days.

(21) Appl. No.: 09/440,187

(22) Filed: Nov. 15, 1999

(51) Int. Cl.⁷ ................................................. B64C 37/02
(52) U.S. Cl. ................................................ 244/1 R; 505/879
(58) Field of Search .................................. 244/1 R, 166; 310/90.5; 505/903, 879

(56) References Cited

U.S. PATENT DOCUMENTS

| | | | |
|---|---|---|---|
| 4,874,346 | * 10/1989 | Wachspress | ............ 446/484 |
| 5,267,091 | * 11/1993 | Chen | ............ 359/872 |
| 5,430,009 | * 7/1995 | Wang | ............ 505/166 |
| 5,831,362 | * 11/1998 | Chu et al. | ............ 310/90.5 |
| 5,841,211 | * 11/1998 | Boyes | ............ 310/90 |
| 6,193,194 | * 2/2001 | Minovitch | ............ 244/172 |

\* cited by examiner

Primary Examiner—Peter M. Poon
Assistant Examiner—Kevin Jakel
(74) Attorney, Agent, or Firm—William Nitkin

(57) ABSTRACT

A craft that includes superconductive materials that are supported within the geomagnetic field of the earth by means of the Meissner effect. The craft is propelled by means of directing a current from a point to another therein which creates a propelling force thereon within such magnetic field as determined by the right-hand motor rule.

11 Claims, 5 Drawing Sheets

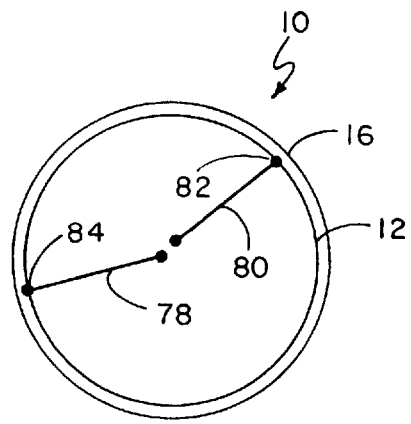
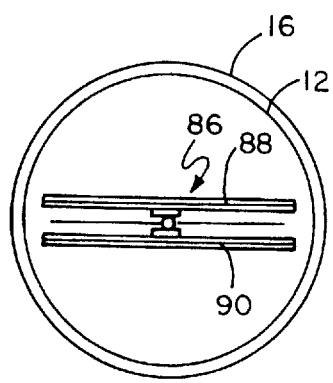
FIG.11   FIG.12
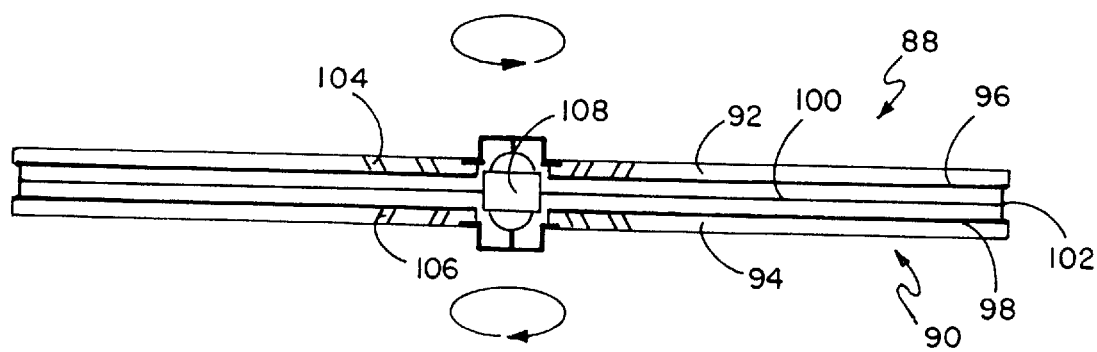
FIG. 13

US 6,318,666 B1

SUPERCONDUCTIVE GEOMAGNETIC CRAFT

BACKGROUND OF THE INVENTION

1. Field of the Invention

The device of this invention resides in the field of aircrafts for transportation, and more particularly relates to a craft that is supported and propelled by using the earth's geomagnetic field.

2. History of the Prior Art

It is well known that superconductive materials can be supported by a magnetic field which phenomenon is referred to as the Meissner effect. It is also known that if current is passed through a conductor crossing magnetic field lines, a force is exerted on such conductor in a direction determined by the right-hand motor rule. It is also known that if a large current is passed through a superconducting material, it will cause that material to become non-superconducting and to return to being a normal conductor. This level of current is referred to as the critical current density.

SUMMARY OF THE INVENTION

It is an object of this invention to utilize the geomagnetic field of the earth to support and propel a superconducting lightweight craft. In a preferred embodiment such craft can be spherical in shape. Other shapes such as a cylindrical or planar shape, etc. can also be used. In its simplest form such craft can be a superconducting layer formed on a lightweight aerogel insulation hollow sphere. The Meissner effect is well known and is usually demonstrated by cooling a fixed superconductor and having a rare earth permanent magnet levitate above it. This configuration is utilized because if one levitates the superconductor, it is no longer in contact with the coolant and soon warms above the critical temperature and thus is no longer levitated. The superconducting sphere of this invention acts as a diamagnet which repels the geomagnetic force fields thereagainst and tends to position itself at right angles to such magnetic lines of force. The magnetic force field utilized in this invention is the earth's geomagnetic field.

It is a further object of this invention to provide a superconductor having its own cooling means and also to provide for a thermal barrier to prevent heat gain from the environment. Such craft can also have electrodes attached at various points on its surface, as described in further detail below. It is known that if a conductor carries a moving electric charge when placed in a magnetic field, a force is exerted on that conductor. The force is proportional to the current in the conductor and to the magnetic density of the field. The force on the conductor also depends upon the angular position of the conductor relative to the direction of the magnetic flux lines where:

B is the flux density in gauss

I is the current in amperes

L is the length of the field in centimeters

When the current direction is at right angles to the magnetic field, the relationship is:

$$\frac{B \times I \times L}{9800} = \text{Force } (F) \text{ in grams}$$

This resultant force is produced between the geomagnetic field and the lines of force surrounding the current-carrying superconducting sphere.

If a current is passed from a first electrode on one side of the sphere of this invention to a second electrode on the opposite side of the sphere at a current level below the critical current density level, the sphere will retain its superconducting properties; but due to the right-hand motor rule wherein a conductor, such as the sphere, when it is in a magnetic field such as the geomagnetic field of the earth, carries a moving electric current, a force is exerted on the conductor, i.e. sphere, in direct proportion to the current passing through the conductor and to the density of the flux in the magnetic field. The force exerted also depends upon the position of the conductor relative to the direction of the magnetic lines of force. In this fashion when multiple electrodes are attached at most points at 90 degrees to one another on the sphere and selectively activated, a force is created on the sphere in a desired direction to propel the sphere. Further, if a higher than critical current density level is directed to the area of attachment on the sphere which causes the surrounding area of the sphere to become non-superconducting, such area no longer repels the earth's geomagnetic field. The repulsion, though, on the remainder of the sphere causes the sphere to be propelled in the direction where there is no such repulsion. The areas of lack of repulsion can be changed on the sphere by directing a current higher than the critical current density level to different portions of the sphere, thereby propelling the sphere in different selected directions. The area of lack of repulsion can also be affected by heating such area, such as with a laser beam, above the temperature where the superconductor becomes non-superconducting, or one could cease cooling a desired area.

Because the earth's magnetic field is not strong, a large area has to be presented to the geomagnetic field in order to be effective. And, contrarily, if the size of the sphere is large, the weight of the sphere has to be small. Therefore, it is a still further object of this invention to provide a method of construction that provides extremely lightweight spheres. In one embodiment liquid nitrogen is aspirated into the interior of a single sphere having a superconductive material layered onto its inside surface. As the liquid nitrogen gasifies, it further cools due to evaporative cooling. A pressure can be maintained inside the sphere and a relief valve can be provided to the outside of the sphere to control any excess pressure.

In another embodiment of this invention a hollow, lightweight, thermally insulative material is provided as a support substrate for a layer of superconducting material. An inner, lightweight, thermally insulative dam is provided which allows for a gap between the inner material and the superconductive layer into which gap a cryogenic gas or liquid is entered. Spherical and cylindrical shapes are most accommodating for this purpose. The example illustrated in this application uses a hollow sphere for both a substrate for the superconductor to be layered onto its interior surface and as the floating positionable inner dam to provide a minimal volume in such gap for liquefied gas to be entered therein. Irrespective of the control and propulsion aspects described below, the craft of this invention can levitate in the geomagnetic field and has useful purposes, such as display effects and minimal payload bearing capabilities.

Various ways of manufacturing a hollow superconducting spheres are taught in the methods described in my following patents: U.S. Pat. Nos. 5,284,606; 5,693,269; 5,322,652; 5,073,317; and 5,507,982. The superconducting sphere could be made in orbit, shielded, and brought back to earth where panels of aerogel would be adhered to it.

With the increasing interest in organic superconductors and the search for ever higher critical temperatures, it is foreseen that a more conventional cooling system could be used in the not too distant future. The possibility of making a hollow sphere consisting of foamed or porous inorganic or polymeric superconducting material exists.

The sphere embodiment of this invention, not needing a second concentric sphere, can be composed of a porous or foamed organic superconductor, such as K-(d-ET)2Cu (NCS)2, which itself can be a moderately good thermal insulator. At the present time only liquid hydrogen can bring these types of superconductors to their critical temperature, being from 1.2 K. to 12 K. The superconducting material can also be brought to its critical temperature by means of thermoelectric cooling where heat is transported to radiation fins disposed outside the sphere or by magnetocaloric cooling or other cooling means.

Aerogels having densities as low as 0.003 gm/cu. cm can provide some of the properties needed to construct the craft of this invention. Low-density aerogels having R factors of 20/inch are now being produced.

In order to determine the voltage needed to produce movement in such a craft, one way of making such calculation is to prepare an equation showing in volts/ohms the amount needed to produce a motor force in grams equal to the total weight of the craft. One first must calculate the weight of the outer aerogel sphere, the weight of the superconductive layer, the weight of the nitrogen gas and the weight of the inner aerogel dam sphere to obtain a total weight.

The formula to calculate the volume of a sphere having a radius r is: $4.189\ r^3$. To calculate the volume of a hollow sphere, the volume of a smaller diameter sphere is subtracted from the volume of the larger one. Thus for a hollow aerogel sphere having an outside diameter of 300 cm and a wall thickness of 2.5 cm and using a density of 0.003 gm/cu. cm the following calculations yield its weight:

Vol. of hollow sphere=$4.189\ r_1^3 - 4.189\ r_2^3$ $4.189 \times 300/2^3 - 4.189 \times 300 - 5/2^3$ $4.189 \times 3,375,000.0 - 4.189 \times 3,209,047.0$ $14,137,875.0 - 13,442,697.0 = 695,178.0$ cu. cm multiplying by the density 0.003:

695,178.0 cu. cm×0.003=2,085.5 gm

To calculate the volume and weight of the superconducting layer having a thickness of 0.062 mm if the outside diameter of the superconducting shell equals the inside diameter of the outer aerogel sphere: 295 cm.

The superconducting material density is calculated with 4.8 grams/cu cm $4.189 \times 3000 - 50/2^3 - 4.189 \times 3000 - 50 - 0.125/2^3$ $1.3443 \times 10^{10} - 1.3441 \times 10^{10} = 1,708,740.0$ cu. mm 1,708,740.0 cu. mm×0.001=1,708.7 cu. cm multiplying by the density 4.8 gm/cu. cm:

1,708.7 cu. cm×4.8 gm/cu. cm=8,201.9 gm

The vapor density for nitrogen gas at its normal boiling point is 4.6 gm/L. In a craft that utilizes an inner aerogel dam sphere, one must calculate the volume of the gap between the superconductive layer and the outer diameter of the inner aerogel sphere. If one starts with the inside diameter of the superconductive layer and subtracts an inner sphere of a volume having a diameter that is 10 mm less than the superconductive layer, one can determine the weight of the nitrogen gas as follows:

$4.189 \times 3000 - 50 - 0.125/2^3 - 4.189 \times 3000 - 50 - 0.125 - 10/2^3$ $1.3441 \times 10^{10} - 1.3305 \times 10^{10} = 136,230,950.0$ cu. mm.

136,230,950.0 cu. mm×0.001×136,230.9 cu. cm.

136,230.9 cu. cm×0.001=136.2 liters 136.2 liters×4.6 gms/L=626.7 gms

One then must determine the weight of the inner dam sphere, measuring from the inside diameter of the space calculated to hold the nitrogen and subtracting a sphere volume having a diameter that is 10 mm less.

$$4.189 \times \frac{3000 - 50 - .125 - 10^3}{2} - 4.189 \times \frac{3000 - 50 - .125 - 10 - 10^3}{2}$$

$1.3305 \times 10^{10} - 1.3169 \times 10^{10} = 135,307,310.0$ cu. mm 135,307,310.0 cu. mm×0.001=135,307.31 cu. cm.

135,307.31 cu. cm×0.003 grams/cu cm=406.0 grams

One can then add the weights of the craft together to reach the following total:

| |
|---|
| 2,085.5 grams |
| 8,201.9 grams |
| 626.7 grams |
| 406.0 grams |
| 11,320 grams |

One then uses the equation discussed above to show the force in grams sufficient to produce a motive force that is at least equal to the total weight of the craft where the weight of the craft is substituted for the force. The average geomagnetic field strength is about 0.47 gauss.

$$\text{force in grams }(f) = \frac{\text{flux density in gauss} \times \text{current in amperes} \times \text{length of the field in centimeters}}{9800}$$

$$11,320.0 \text{ grams} = \frac{.47 \text{ gauss} \times \text{current in amperes} \times 300 \text{ cms}}{9800}$$

Then to determine current in amperes:

$$\frac{11,320.0 \text{ grams} \times 9800}{300 \text{ cm} \times .47 \text{ gauss}} = \text{current in amperes}$$

$$\frac{110,936,000.0}{141} = 786,780.0 \text{ amperes}$$

One then solves for volts as if the resistance were 0.001 ohm. When a superconductor is below its critical temperature, it has zero resistance. However, because one cannot use a zero as a denominator, 0.001 ohm is used for further calculations.

$$\text{amperes} = \frac{\text{volts}}{\text{ohms}}$$

$$786{,}780.0 \text{ amperes} = \frac{\text{volts}}{\text{ohms}}$$

$$786{,}780.0 \text{ amperes} = \frac{\text{volts}}{.001 \text{ ohms}}$$

786,780.0 amperes×0.001 ohms=786 volts

It is known that such energy voltage can be beamed, such as by a laser beam, to such a craft by free electron lasers which are being now developed by NASA and in other countries.

In a further embodiment a thin metallized film, such as a layer of aluminum or equivalent, can be applied onto the outer surface of the outer aerogel insulation being thus separate from the superconductive layer which metallized outer film can be used to provide additional lift. When a high voltage source or static generator is connected to the aluminum metalizing, it creates a static charge buildup. The craft is then a charged body and will be subject to Lorenz forces.

The Lorenz force can be illustrated by a charged particle moving in a magnetic field which particle is subject to a force in a direction perpendicular to its direction of travel and also perpendicular to the direction of the magnetic field. If Q is the magnitude of the charge, v its velocity, B the flux density of the magnetic field, and Rad the angle between the direction of B and the direction of travel of the particle, the force on the particle is:

$$F = QvB \sin \text{Rad} = Qv \times B$$

The aluminum, which is very magnetically permeable and electrically insulated by the outer aerogel sphere, will not affect the operation of the right hand motor rule (motor action), the force generated by the current flowing through the superconductor reacting with the geomagnetic field. Also the aluminum metalizing will not interfere with the levitation of the sphere caused by the Meissner effect which has not been calculated for above. When the craft is propelled by the motor action and the now-charged sphere body is moving through the geomagnetic field, the Lorenz force will cause the craft to be accelerated in a direction N at right angles to its motion which occurs when the craft is moving at the correct angle to the geomagnetic field.

BRIEF DESCRIPTION OF THE DRAWINGS

FIG. 11 illustrates a side elevational cross-sectional view of a sphere with movable internal electrical contacts.

FIG. 12 illustrates a side elevational cross-sectional view of a sphere containing counter-rotating disks forming a gyroscope therein.

FIG. 13 illustrates a side elevational cross-sectional view of a pair of counter-rotating disks, each formed of aerogel and a superconductive layer.

DESCRIPTION OF THE PREFERRED EMBODIMENT(S)

Figure 1:
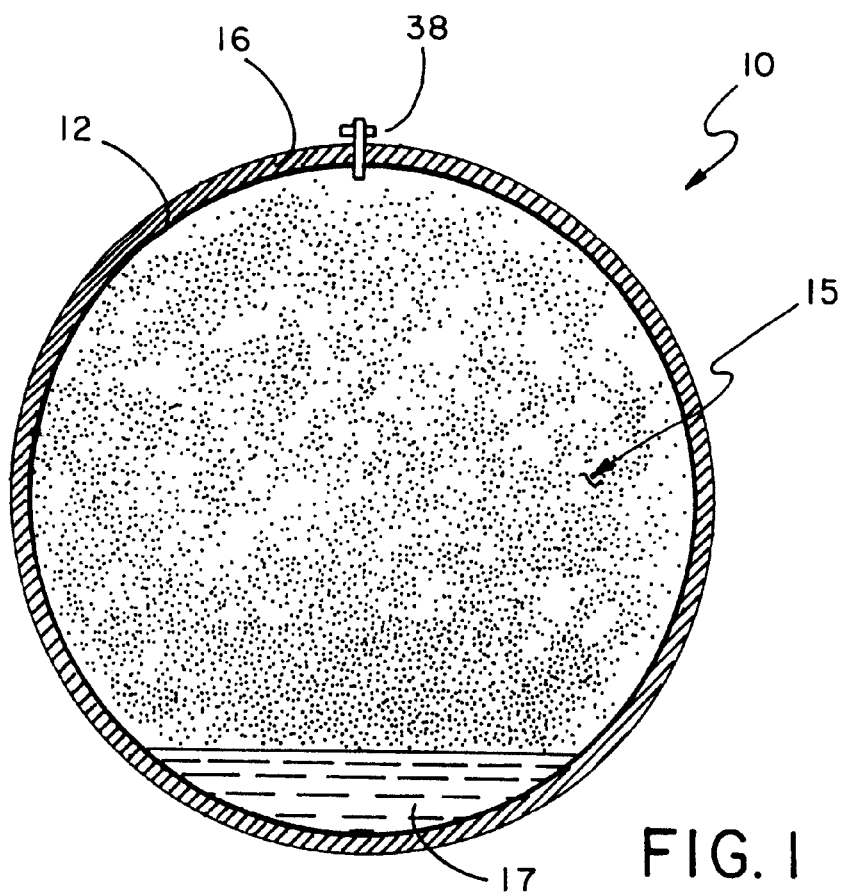
FIG. 1 illustrates a side elevational cross-sectional view through the superconductive geomagnetic craft of this invention.
Figure 2:
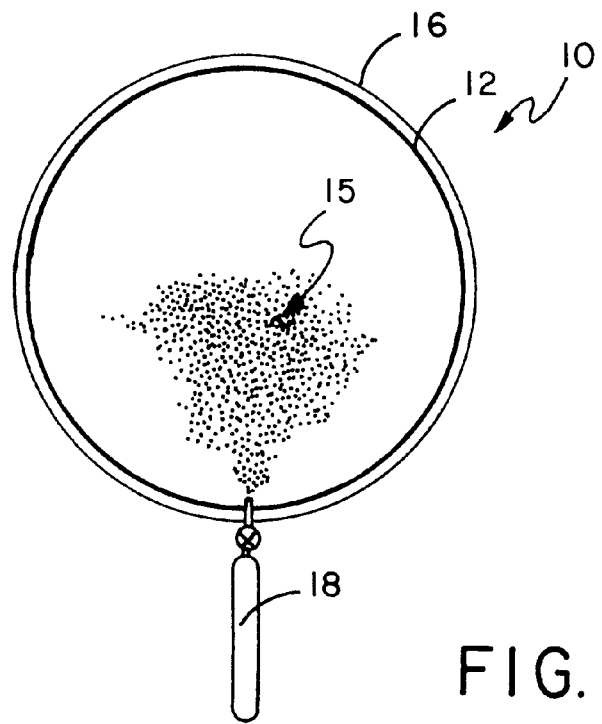
FIG. 2 illustrates a side elevational cross-sectional view through a second embodiment of the craft of this invention having external liquid nitrogen supply.
Figure 3:
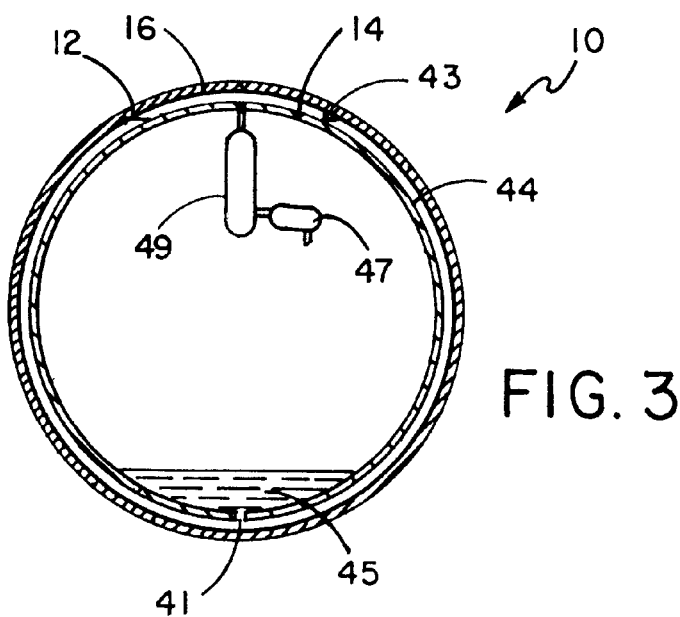
FIG. 3 illustrates a side elevational cross-sectional view through a third embodiment of the craft of this invention having a second internal sphere creating a space to direct coolant onto the superconductive layer.
Figure 4:
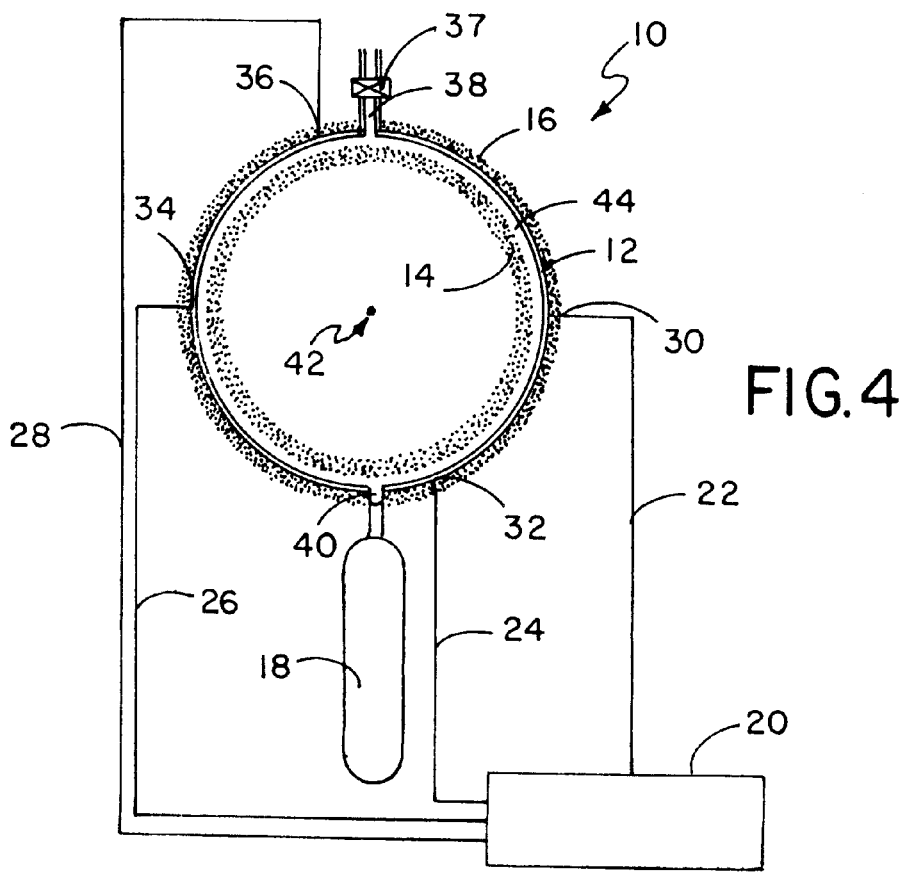
FIG. 4 illustrates a side elevational cross-sectional view through a fourth embodiment of the craft of this invention with current directed to points on the superconductive layer.

FIG. 1 illustrates the simplest form of the superconductive geomagnetic craft 10 of this invention. Seen in this illustration is outer aerogel insulative layer 16 in spherical form. Immediately on the inside of this layer is a thin superconductive layer 12. The materials forming such thin superconductive layer can be made of any commercial superconductive material which materials are well known and which can be formed on the inner surface of the aerogel substrate by several processes such as laser sintering, plasma spraying, sputter coating, powder coating followed by flash surface heating, and in some cases even by disposing superconductive tape or wire on such substrate. Such superconductive materials can include, but are not limited to, ductile alloys, intermetallic compounds, perovskite, metal oxides of yttrium, barium, and copper combined with citric acid and ethylene glycol which is pressed and fired. The superconductive material can be cooled by providing liquid nitrogen 17 within the sphere. Liquid nitrogen turns to gas 15 to cool superconductive layer 12. A relief valve 38 can be provided. FIG. 2 illustrates a similar embodiment of craft 10 where a gasified liquid nitrogen 15 is entered from liquid nitrogen tank 18 into craft 10. FIG. 3 illustrates an embodiment with an inner aerogel insulative hollow core 14 acting as a dam having a smaller outer diameter than the inside diameter of the outer sphere spaced away a distance forming a void being space 44 from the superconductive layer such that the liquid nitrogen 45 in the structure can be drawn upward through inlet 41 into space 44 to contact and cool the superconductor by vacuum pump 47 through vacuum tank 49 up to liquid nitrogen level 43. FIG. 4 illustrates a similar spherical geomagnetic craft 10 as that seen in FIG. 3 but with liquid nitrogen from tank 18 provided into space 44 through inlet 40 with a relief valve 38 located on the opposite side of the sphere. Valve 37 can close relief valve 38 when desired. Without more structure the extremely lightweight craft of this invention would be repelled by the geomagnetic field of the earth equally on all sides and would be effectively in a static balance with such magnetic field exerting approximately equal repulsive force at all points therearound. To create propulsion, a series of electrical lines, such as first line 22, second line 24, third line 26 and fourth line 28 extend from an electrical current generator 20 to positions approximately 90 degrees from one another on the surface of the craft. Not seen in FIG. 4 are electrical lines which run to opposite points 42 on the front and rear of the craft. First line 22 makes contact with right side 30 of the sphere; second line 24 makes contact with bottom 32 of the sphere; third line 26 makes contact with left side 34 of the sphere; and fourth line 28 makes contact with top 36 of the sphere. When, for example, the current runs to at least two electrical contacts which are diametrically opposed to one another, such as through first line 22 and third line 26 to right side 30 and left side 34, respectively, of the sphere, at a current level of less than the critical current density, a current passes around the sphere in a direction and at an angle to the geomagnetic lines of force. According to the right-hand motor rule, a force is exerted to propel the sphere in a direction determined by the angle of the geomagnetic field flux to the direction of the current passing through the sphere which force is further dependent on the density of the flux in the magnetic field. Thus, by choosing through which diametrically opposed electrodes to activate a current, one can change the direction of movement of the craft by the current flow's angle of interaction with the geomagnetic field as long as one maintains the maximum force angle of current flow. If, as described above, the current intensity is above the critical current density level which can be localized by utilizing two closely spaced electrodes on a localized side surface of the sphere and directing current therebetween, the superconductivity of the sphere at such localized side surface ceases so that the sphere is no longer repulsed at such localized side surface and the sphere is then affected by the force of the geomagnetic field's repulsion against the remainder of the sphere to move such sphere in the direction where there is no longer such repulsive force.

Electrical contact can be made with the craft not only by means of electrodes attached to the exterior thereof, but also, as seen in FIG. 11, by means of first and second interior arms 78 and 80, respectively, each carrying a different pole of the current, being directable to various contact points such as first contact 82 and second contact 84 on the interior of craft 10.

In FIG. 12 an alternate embodiment of the craft of this invention can include the placement therein of gyroscope 86 to stabilize the craft at an optimum angle to the geomagnetic field. One must overcome the transmission of torque to the craft so that a pair of flywheels 88 and 90 rotating opposite to one another can be utilized.

FIG. 13 illustrates yet another alternate embodiment of the craft of this invention wherein counter-rotating disk-shaped structures acting as flywheels can be made of two circular aerogel disks 92 and 94, each having a superconductive coating on one of its surfaces, such as first superconductive layer 96 and second superconductive layer 98, or a superconductive coating can be positioned on both surfaces of both disks. Such counter-rotating disks act as flywheels and can be levitated as described above and moved through the geomagnetic field by the application of current to positions thereon such that they are affected by the right-hand rule. Further, if the counter-rotating disks have the superconductive layers on the exterior with the inside of each disk formed of the insulative layer such as aerogel, additional structure can be added such as metallic foil and collecting combs so as to form a Wimshurst generator in order to generate the voltage that can be used for propulsion according to the right-hand rule, as described above. To overcome the heaviness if one were to use motor drives with counter-rotating transmissions, one can create such craft with turbine fins or angular ports 104 and 106 formed as part of the aerogel disks with the fins angled at the appropriate direction through which is directed a stream of liquid nitrogen, not shown, to rotate such disks and to cool them below their critical temperature. This craft would be held in the proper orientation to the geomagnetic field by the gyroscopic effect of the rotating disks which are freewheeling. A motor 108 can be used. To affect the contact of electrodes 100 which might otherwise interfere with the movement of the disks, electrode contacts 102 can be positioned close to the superconductive layers on the sides of the disks such that with the use of a sufficiently high voltage, the current would jump the gap between the electrode and the superconductive portions of the disks. It should be noted that the rotating disks described above can be used in combination with the aforementioned crafts with such disks located within or external to such crafts as the gyroscopic effect will aid in keeping the craft properly positioned within the geomagnetic field. The sphere portion of the craft can be utilized to correct for any drift along with jet thrusters or propellers which also can be utilized for such purposes.

In order to restrict the weight of the craft by not utilizing batteries, fuel powered electric generators or other type of electric generator, energy can be beamed to the craft by microwaves or other wavelength energy such as infrared or solar light (collected and refocused) which can then be converted to electrical current by thermionic, photovoltaic or other such conversion systems to power the craft.

Figure 5:
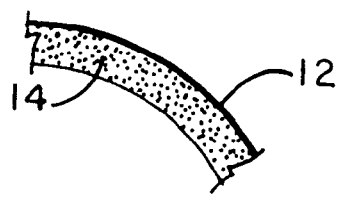
FIG. 5 illustrates a cross-section of a section of the wall of the craft of this invention having an outer superconductive layer and an inner aerogel layer.
Figure 6:
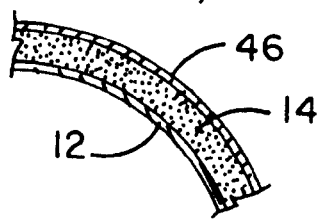
FIG. 6 illustrates a cross-section of a section of the wall of the craft of this invention having a plurality of solar-powered cells disposed on the outer surface of the insulative layer.
Figure 7:
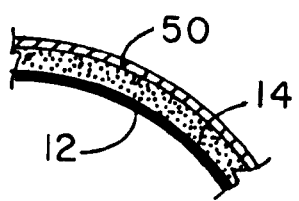
FIG. 7 illustrates a cross-section of a section of the wall of the craft of this invention having an exterior layer of metallized film on the insulative layer.

FIG. 5 illustrates an alternate embodiment of the invention wherein superconductive layer 12 is on the exterior of an inner aerogel insulative layer 14. FIG. 6 illustrates an alternate embodiment wherein the craft of FIG. 5 further includes a plurality of solar cells 46 disposed on the outer surface of insulative layer 14. FIG. 7 illustrates a section of the wall of the embodiment having a metallized film 50 disposed on insulative layer 14.

It should be noted that although the craft of this invention has been illustrated as being spherical, any shape can be utilized. Further, the craft of this invention has been illustrated as being hollow which feature is helpful as the craft must be extremely light in weight. Such hollow area can be filled in some embodiments with a lighter-than-air gas to aid in providing lift to the craft. In other embodiments the central area of the craft can have a vacuum therein. And in still another embodiment the central area of the craft or a part of it can be used for payload.

Figure 8:
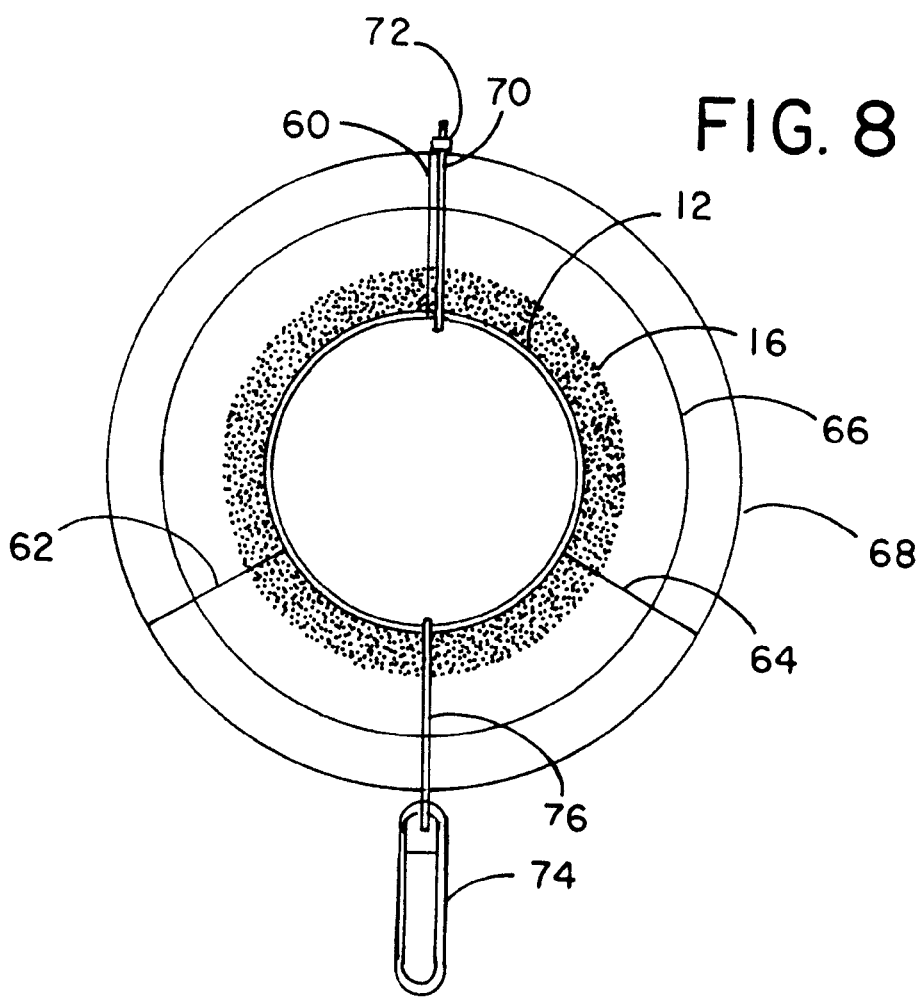
FIG. 8 illustrates a side elevational cross-sectional view of the craft of this invention utilizing Mylar balloons as insulation and lift providers.

A further embodiment of the craft can be seen in FIG. 8 wherein superconductive layer 12 surrounded by aerogel insulative layer 16 is suspended by means of first tether 60, second tether 62 and third tether 64 within an inflated reflective Mylar balloon that is attached to the tethers so that it is concentric to superconductive layer 12 and to aerogel insulative layer 16. An outer Mylar balloon 68 can also be positioned on such tethers concentric to inner Mylar balloon 66. Nitrogen gas to cool superconductive layer 12 can be directed from nitrogen tank 74, through inlet 76 and into the open core within superconductive layer 12. A gas vent 70 can be provided with a pressure relief valve 72 thereon. The Mylar balloons can act as insulators or as lift providers, or both. Lighter-than-air gas can be entered into the Mylar balloons to provide additional lift.

Figure 9:
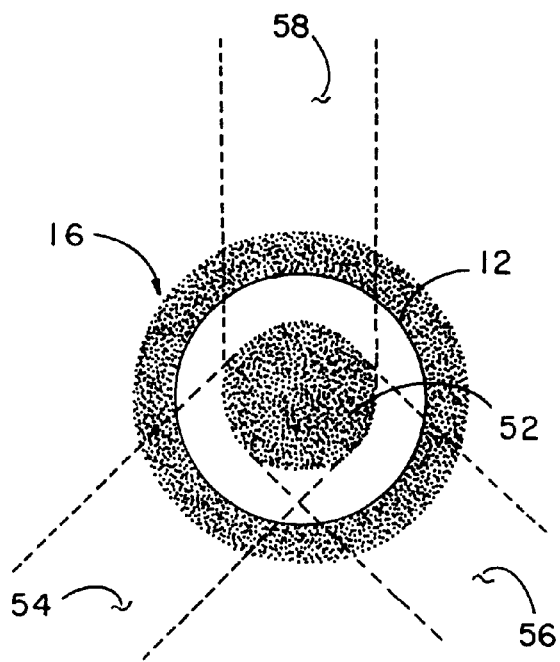
FIG. 9 illustrates a side elevational cross-sectional view of the craft of this invention utilizing a Bose-Einstein condensate to cool the super conductive layer.
Figure 10:
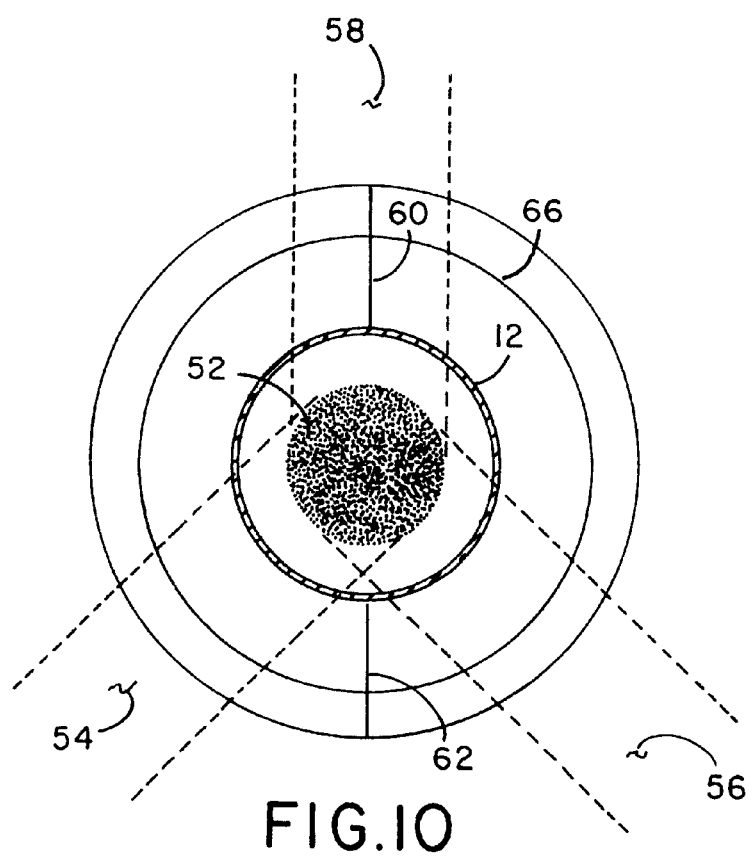
FIG. 10 illustrates a side elevational cross-sectional view of the craft of this invention utilizing a Bose-Einstein condensate to cool the super conductive layer suspended within Mylar balloons.

In yet a further alternate embodiment, the cooling of superconductive layer 12, seen in FIG. 9, can be accomplished by a Bose-Einstein condensate 52 which is first cooled then maintained cold by laser beams, such as first laser beam 54, second laser beam 56 and third laser beam 58, are directed thereon. In this alternate embodiment the superconductive sphere acts as a magnetic trap for the Bose-Einstein condensate 52. The superconductive layer 12 and aerogel layer 16 must be transparent to the atomic resonance of the laser frequency to allow it to penetrate the sphere.

It should be noted that the cooling of the superconductive layer to achieve its superconducting properties can be accomplished by many cooling methodologies such as discussed above but which should be considered to include, but not be limited to, the use of other types of liquid gases, magnetocaloric and thermoelectric-type cooling. Further the power sources for high voltage to achieve propulsion can come from a variety of sources, such as those listed above but which also can include high-voltage pulsed power from gas-powered internal combustion engines and/or generators, solar cells, nuclear power, cold fusion, battery power, human-derived motive power and various circuitries for the continuing current flow through the superconducting loop within the superconductive layer.

It should also be considered within the scope of this invention that multiple crafts of this invention can be utilized in association with, and in conjunction with, one another. Some embodiments of the craft of this invention can receive benefits from being spun while being levitated within the geomagnetic field.

Although the present invention has been described with reference to particular embodiments, it will be apparent to those skilled in the art that variations and modifications can be substituted therefor without departing from the principles and spirit of the invention.

I claim:

1. A craft comprising:
    a superconductor that is levitated by the earth's geomagnetic field wherein said superconductor is in the form of a superconductive layer and further includes an aerogel substrate on which said superconductive layer is positioned.

2. The craft of claim 1 further including:
    means for motive force by directing electrical current in a direction across said superconductor to create motion at right angles to the direction of such current by said craft.

3. The craft of claim 1 wherein said superconductive layer is in the form of a hollow sphere surrounded by said aerogel substrate.

4. The craft of claim 3 further including means to cool said superconductive layer.

5. The craft of claim 4 further including an inner aerogel dam positioned to define a void between said dam and said superconductive layer.

6. The craft of claim 5 wherein said inner aerogel dam is positioned concentric to said hollow spherical superconductive layer and wherein said means to cool said superconductive layer comprises liquid nitrogen entered into said void defined between said aerogel dam and said superconductive layer.

7. The craft of claim 6 further including at least two electrical contacts positioned diametrically to one another on said superconductive layer for passing an electrical current between said contacts to create said means for motive force at right angles to the direction of such current according to the right-hand motor rule.

8. The craft of claim 7 wherein said inner aerogel dam has a hollow central area defined therein.

9. The craft of claim 8 further including a lighter-than-air gas disposed within said hollow central area.

10. The craft of claim 4 further including a metallized coating disposed on said sphere of aerogel substrate and superconductive layer.

11. The craft of claim 4 further including at least one reflective Mylar balloon surrounding said sphere of aerogel substrate and superconductive layer.

* * * * *